US009292225B2

(12) United States Patent
Chakhaiyar

(10) Patent No.: US 9,292,225 B2
(45) Date of Patent: Mar. 22, 2016

(54) METHODS FOR FRAME ORDER CONTROL AND DEVICES IN STORAGE AREA NETWORK

(71) Applicant: Wipro Limited, Bangalore (IN)

(72) Inventor: Madhukar Gunjan Chakhaiyar, Gaya (IN)

(73) Assignee: Wipro Limited, Bangalore, IN (US)

( * ) Notice: Subject to any disclaimer, the term of this patent is extended or adjusted under 35 U.S.C. 154(b) by 52 days.

(21) Appl. No.: 14/143,242

(22) Filed: Dec. 30, 2013

(65) Prior Publication Data

US 2015/0142997 A1  May 21, 2015

(30) Foreign Application Priority Data

Nov. 15, 2013  (IN) ............................ 5263/CHE/2013

(51) Int. Cl.
*G06F 3/06* (2006.01)
(52) U.S. Cl.
CPC .............. *G06F 3/0661* (2013.01); *G06F 3/061* (2013.01); *G06F 3/067* (2013.01); *G06F 2003/0697* (2013.01)
(58) Field of Classification Search
None
See application file for complete search history.

(56) References Cited

U.S. PATENT DOCUMENTS

| | | | |
|---|---|---|---|
| 6,931,523 B1* | 8/2005 | Tomoson et al. | 713/100 |
| 7,457,902 B2 | 11/2008 | Yang et al. | |
| 7,917,682 B2* | 3/2011 | Bakthavathsalam | 710/315 |
| 2003/0093541 A1* | 5/2003 | Lolayekar et al. | 709/230 |
| 2007/0002827 A1* | 1/2007 | Lau et al. | 370/351 |
| 2008/0022026 A1* | 1/2008 | Yang et al. | 710/200 |
| 2011/0182294 A1* | 7/2011 | Lee et al. | 370/394 |
| 2014/0143453 A1* | 5/2014 | Myrah et al. | 710/19 |

* cited by examiner

*Primary Examiner* — Eric Oberly
(74) *Attorney, Agent, or Firm* — LeClairRyan, a Professional Corporation

(57) ABSTRACT

A method, non-transitory computer readable medium, and device that sends an outgoing storage device frame to a storage device, the outgoing storage device frame converted from an incoming storage device frame received from a host device based on a protocol supported by the storage device. An incoming host device frame is received from the storage device in response to the outgoing storage device frame. Whether an outgoing host device frame has been sent to the host device is determined, the outgoing host device frame converted from the incoming host device frame based on a protocol supported by the host device, wherein the protocol supported by the host device requires a different frame sequencing than the protocol supported by the storage device. A next incoming storage device frame received from the host device is retrieved when the outgoing host device frame is determined to have been sent to the host device.

24 Claims, 4 Drawing Sheets

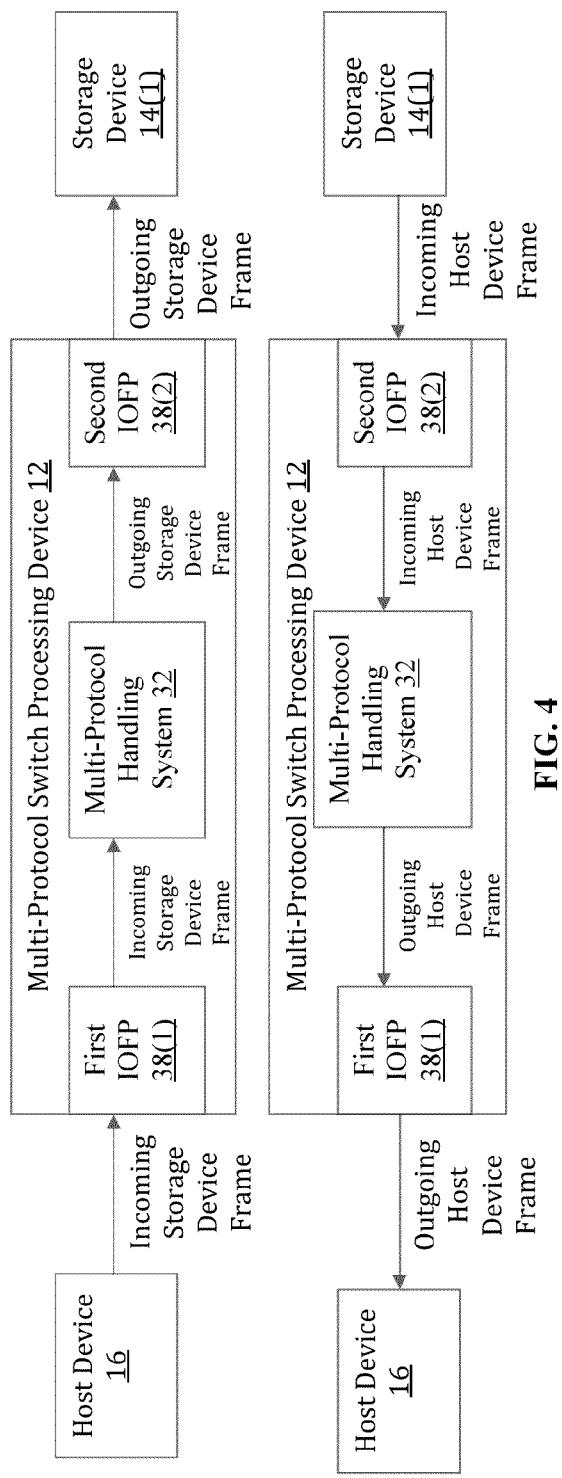

METHODS FOR FRAME ORDER CONTROL AND DEVICES IN STORAGE AREA NETWORK

CROSS-REFERENCE TO RELATED APPLICATIONS

This application claims the benefit of Indian Patent Application Filing No. 5263/CHE/2013, filed Nov. 15, 2013, which is hereby incorporated by reference in its entirety.

FIELD

This technology relates to storage area networks (SANs), and particularly to methods for frame order control in multi-protocol SANs and devices thereof.

BACKGROUND

Storage area networks (SANs) are increasingly used by enterprises and other hosts to store large amounts of data. Many SANs include host and storage devices having different supported protocols to take advantage of different associated capabilities (e.g. bandwidth or physical range). Exemplary protocols supported by devices in a SAN can include Infini-Band (IB), Serial Attached Small Computer System Interface (SAS), Internet Small Computer System Interface (iSCSI), Serial Advanced Technology Attachment (SATA) or Fibre Channel (FC) for example, although other protocols are also used. Some of these protocols allow/facilitate in-order frame sequencing and other of these protocols allow/facilitate out-of-order frame sequencing.

In order to facilitate communications between the host and storage devices, SANs can include multi-protocol switch processing devices that convert incoming and outgoing frames depending on the protocols respectively supported by the host and storage devices for each transaction. Accordingly, the multi-protocol switch processing device may be handling traffic associated with various protocols requiring in-order and out-of-order frame sequencing. Due to the use of protocols requiring both in-order and out-of-order frame sequencing, multi-protocol SANs often experience significant frame drops/loss and associated retransmissions, out of order delivery, and frame misdirection, among other undesirable effects on the performance of the SAN.

Currently, frame order control methods include lock and release mechanisms implemented by a multi-protocol switch processing device that prevent out-of-order frames from being received and processed. Accordingly, these frame order control methods are only effective for SANs in which the host and storage devices both support protocols requiring in-order frame sequencing (e.g., FC and SATA), and are ineffective for controlling frame order for host and storage devices supporting protocols requiring out-of-order frame sequencing. Therefore, current frame order control methods do not effectively mitigate the undesirable performance issues present in SANs having devices supporting protocols requiring out-of-order and in-order frame sequencing.

SUMMARY

A method for frame order control includes sending with a multi-protocol switch processing device an outgoing storage device frame to a storage device. The outgoing storage device frame is converted with the multi-protocol switch processing device from an incoming storage device frame received from a host device based on a protocol supported by the storage device. An incoming host device frame is received from the storage device in response to the outgoing storage device frame. Whether an outgoing host device frame has been sent to the host device is determined with the multi-protocol switch processing device. The outgoing host device frame is converted with the multi-protocol switch processing device from the incoming host device frame based on a protocol supported by the host device, wherein the protocol supported by the host device requires a different frame sequencing than the protocol supported by the storage device. A next incoming storage device frame received from the host device is retrieved with the multi-protocol switch processing device when the outgoing host device frame is determined to have been sent to the host device.

A non-transitory computer readable medium having stored thereon instructions for frame order control comprising machine executable code which when executed by a processor, causes the processor to perform steps including sending an outgoing storage device frame to a storage device. The outgoing storage device frame is converted from an incoming storage device frame received from a host device based on a protocol supported by the storage device. An incoming host device frame is received from the storage device in response to the outgoing storage device frame. Whether an outgoing host device frame has been sent to the host device is determined. The outgoing host device frame is converted from the incoming host device frame based on a protocol supported by the host device, wherein the protocol supported by the host device requires a different frame sequencing than the protocol supported by the storage device. A next incoming storage device frame received from the host device is retrieved when the outgoing host device frame is determined to have been sent to the host device.

A multi-protocol switch processing device comprising a processor coupled to a memory and configured to execute programmed instructions stored in the memory including sending an outgoing storage device frame to a storage device. The outgoing storage device frame is converted from an incoming storage device frame received from a host device based on a protocol supported by the storage device. An incoming host device frame is received from the storage device in response to the outgoing storage device frame. Whether an outgoing host device frame has been sent to the host device is determined. The outgoing host device frame is converted from the incoming host device frame based on a protocol supported by the host device, wherein the protocol supported by the host device requires a different frame sequencing than the protocol supported by the storage device. A next incoming storage device frame received from the host device is retrieved when the outgoing host device frame is determined to have been sent to the host device.

This technology provides a number of advantages including providing more effective methods, non-transitory computer readable medium and devices for frame order control in multi-protocol storage area networks (SANs). With this technology, frame order is guaranteed for transactions between source and storage devices irrespective of the frame sequencing required by the protocols supported by the devices. Accordingly, various storage devices, with various associated capabilities and supporting protocols requiring both in-order and out-of-order frame sequencing, can be used in SANs without increasing undesirable performance issues.

BRIEF DESCRIPTION OF THE DRAWINGS

FIG. 4 is a block diagram of an exemplary flow of incoming and outgoing frames exchanged between a host device and a storage device; and FIG. 5 is an exemplary table of frame transaction records.

DETAILED DESCRIPTION

Figure 1:
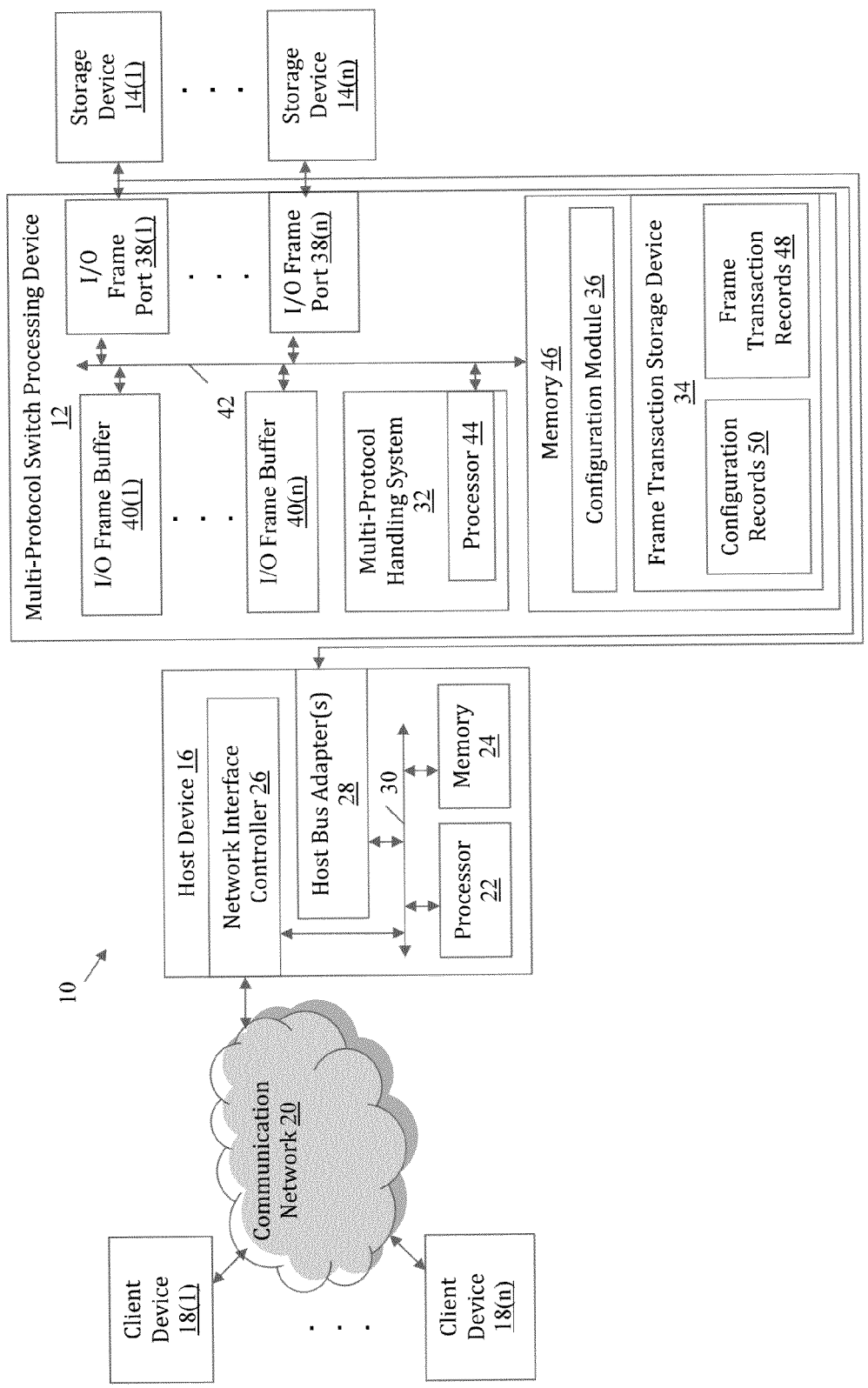
FIG. 1 a block diagram of a network environment with an exemplary multi-protocol switch processing device.

An environment 10 with an exemplary multi-protocol switch processing device 12 coupled to storage devices 14(1)-14(n) and a host device 16 is illustrated in FIG. 1. In this exemplary environment 10, the host device 16 is further coupled to client devices 18(1)-18(n) by a communication network 20. Other numbers and types of systems, devices, and/or elements in other configurations and environments with other communication network topologies can also be used. This technology provides a number of advantages including methods, non-transitory computer readable medium, and devices that facilitate frame order control for multi-protocol storage area networks (SANs).

In this example, the client computing devices 18(1)-18(n) enable a user to request information from the host device 16 using the communication network 20. The host device 16 can store the requested information internally or on one or more of the storage devices 14(1)-14(n). If the requested information is stored on one of the storage devices 14(1)-14(n), the host device 16 can retrieve the information from the one of the storage device 14(1)-14(n) using the multi-protocol switch processing device 12. In this example, the host device 16, storage devices 14(1)-14(n), and multi-protocol switch processing device 12 collectively comprise a storage area network (SAN) that can be used by an enterprise to store information, for example.

The host device 16 in this example includes a processor 22, a memory 24, a network interface controller 26, and host bus adapter(s) 28 coupled together by a bus 30 or other link, although the host device 16 can include other numbers and types of components, parts, devices, systems, and elements in other configurations. The processor 22 in the host device 16 can execute a program of instructions for one or more aspects of the present invention as described and illustrated herein, although the processors could execute other numbers and types of programmed instructions.

The memory 24 in the host device 16 stores these programmed instructions for one or more aspects of the present invention as described and illustrated herein, although some or all of the programmed instructions could be stored and/or executed elsewhere. A variety of different types of memory storage devices, such as random access memory (RAM), read only memory (ROM), one or more hard disk or solid state drives, or other computer readable medium which is read from and/or written to by a magnetic, optical, or other reading and/or writing system that is coupled to the processor 22, can be used for the memory 24 in the host device 16.

The network interface controller 26 of the host device 16 can be used to operatively couple and communicate between the client devices 18(1)-18(n) and host device 16 over the communication networks 20. The communication network 20 can include one or more local area networks (LANs) and/or wide area networks (WANs), for example. By way of example only, the communication networks can use TCP/IP over Ethernet and industry-standard protocols. The host bus adapter(s) 28 can be used to operatively couple and communicate between the multi-protocol switch processing device 12 and the host device 16 each using a respective protocol supported by the host device 16.

The storage devices 14(1)-14(n) can be file storage controllers, devices, and/or servers, for example, that each supports a respective protocol and store information on behalf of the host device 16. Protocols supported by the host device 16 and/or respective ones of the storage devices 14(1)-14(n) can include InfiniBand (IB), Serial Attached Small Computer System Interface (SAS), Internet Small Computer System Interface (iSCSI), Serial Advanced Technology Attachment (SATA) or Fibre Channel (FC), for example, although other protocols can also be used. In this exemplary SAN, at least one of the storage devices 14(1)-14(n) supports a protocol requiring in-order frame sequencing and at least one of the storage devices 14(1)-14(n) supports a protocol requiring out-of-order frame sequencing.

The storage devices 14(1)-14(n) can have various advantages and disadvantages and can be used for different storage purposes or for storing different types of data depending on requirements. For example, one of the storage devices 14(1)-14(n) can support the IB protocol which is associated with relatively large bandwidth communications, another of the storage devices 14(1)-14(n) can support iSCSI which requires relatively cheap infrastructure but is also relatively susceptible to frame drops, another of the storage devices 14(1)-14(n) can support SAS which facilitates communications over a relatively limited physical distance, and yet another of the storage devices 14(1)-14(n) can support FC which supports relatively high bandwidth with relatively lower bit error rate but is limited to about 10-15 Km in physical distance. The storage devices 14(1)-14(n) can also support other protocols having various associated characteristics and used for different purposes. Accordingly, the exemplary multi-protocol SAN, with storage devices 14(1)-14(n) supporting protocols requiring both in-order and out-of-order frame sequencing, provides flexibility for an enterprise with respect to meeting its data storage and retrieval needs.

The communication interface in each of the storage devices 14(1)-14(n) can be used to operatively couple and communicate between each of the storage devices 14(1)-14(n) and the multi-protocol switch processing device 12 using a respective protocol supported by each of the storage devices 14(1)-14(n). Each of the storage devices 14(1)-14(n) in this example includes a processor, a memory, and a communication interface. The processor in the each of the storage devices 14(1)-14(n) can execute a program of instructions for one or more aspects of the present invention as described and illustrated herein, although the processors could execute other numbers and types of programmed instructions.

The memory in each of the storage devices 14(1)-14(n) stores these programmed instructions for one or more aspects of the present invention as described and illustrated herein, although some or all of the programmed instructions could be stored and/or executed elsewhere. The memory in each of the storage devices 14(1)-14(n) includes one or more hard disk or solid state drives, although the memory can also include random access memory (RAM), read only memory (ROM), or other computer readable medium which is read from and/or written to by a magnetic, optical, or other reading and/or writing system that is coupled to the processor.

The multi-protocol switch processing device 12 includes a multi-protocol handling system 32, a memory 46, I/O frame ports 38(1)-38(n) (each also referred to herein as an IOFP), and I/O frame buffers 40(1)-40(n), each coupled to a respective one of the I/O frame ports 38(1)-38(n), coupled together by a bus 42 or other communication link. The multi-protocol handling system 32 includes a processor 44 in this example which can execute a program of instructions for one or more aspects of the present invention as described and illustrated herein, although the processor 44 could execute other numbers and types of programmed instructions. For example, the instructions can include processing incoming and outgoing frames and managing the configuration of the multi-protocol switch processing device 12, among other functions, as described and illustrated in more detail later.

The memory 46 in the multi-protocol switch processing device 12 stores these programmed instructions for one or more aspects of the present invention as described and illustrated herein, although some or all of the programmed instructions could be stored and/or executed elsewhere. A variety of different types of memory storage devices, such as random access memory (RAM), read only memory (ROM), or other computer readable medium which is read from and/or written to by a magnetic, optical, or other reading and/or writing system that is coupled to the processor 44, can be used for the memory 46 in the multi-protocol handling system 32 of the multi-protocol switch processing device 12. In this example, the memory 46 includes a frame transaction storage device 34 and a configuration module 36, although the memory can include other storage devices and/or modules.

The frame transaction storage device 34 is configured to store at least frame transaction records 48 and configuration records 50 in this example, although other information can also be stored by the frame transaction storage device 34. The frame transaction records 48 store information including an indication of an incoming or outgoing port, frame tag identifier, and frame response flag for incoming and outgoing frames processed by the multi-protocol switch processing device 12, as described and illustrated in more detail later.

The configuration records 50 which include one or more of a current configuration record, a modified configuration record, or a last configuration record. The current one of the configuration records 50 can define configurations, associations, and/or mode of the I/O frame ports 38(1)-38(n). For example, the current one of the configuration records 50 can establish an initiator or a target mode for one of the I/O frame ports 38(1)-38(n) thereby defining that only the host device 16 or only one of the storage devices 14(1)-14(n), respectively, can be attached to or utilize the one of the I/O frame ports 38(1)-38(n).

In another example, the current one of the configuration records 50 can establish an association between initiator and target ones of the I/O frame ports 38(1)-38(n) to thereby provide dedicated service for critical I/O transactions. Additionally, the current one of the configuration records 50 can define configurations and/or associations of the I/O frame buffers 40(1)-40(n). Other configurations can also be defined by the configuration records 50.

The configuration module 36 of the multi-protocol switch processing device 12 manages the configuration records 50 in this example. Accordingly, the configuration module 36 can receive a request from an authorized user to change a current one of the current configuration records 50. In response, the configuration module 36 can generate a modified one of the configuration records 50 based on the change request and the current one of the configuration records 50. The configuration module 36 can further adopt the modified one of the configuration records 50 upon reboot or reset by replacing the current one of the configuration records 50 with the modified one of the configuration records 50.

Optionally, the configuration module 36 can further store the replaced current one of the configuration records 50 as a last one of the configuration records 50 in the event the modification needs to be rolled back to a last known good configuration, for example. The configuration module 36 can also perform other functions such as periodically monitoring various operations to review the correctness of the configuration information and/or to confirm the validity of any configuration changes, for example, and other functionality can also be provided.

The I/O frame ports 38(1)-38(n) are connection interfaces for the host device 16 and/or the storage devices 14(1)-14(n) to transmit incoming and outgoing frames, respectively. The I/O frame ports 38(1)-38(n) can be configured by one of the configuration records 50 to receive and/or send packets corresponding with one or more specified protocols, to have a specified mode of operation, or to be associated with the host device 16 or one or more of the storage devices 14(1)-14(n). Each of the I/O frame buffers 40(1)-40(n) is a dedicated high performance storage buffer for one of the I/O frame ports 38(1)-38(n). The I/O frame buffers 40(1)-40(n) are configured to buffer frames received at, or to be sent by, one or more of the I/O frame ports 38(1)-38(n).

Although embodiments of the multi-protocol switch processing device 12, storage devices 14(1)-14(n), host device 16, and client devices 18(1)-18(n), are described and illustrated herein, each of the multi-protocol switch processing device 12, storage devices 14(1)-14(n), host device 16, and client devices 18(1)-18(n), can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and/or micro-controllers, programmed according to the teachings of the embodiments, as described and illustrated herein, and as will be appreciated by those ordinary skill in the art. The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
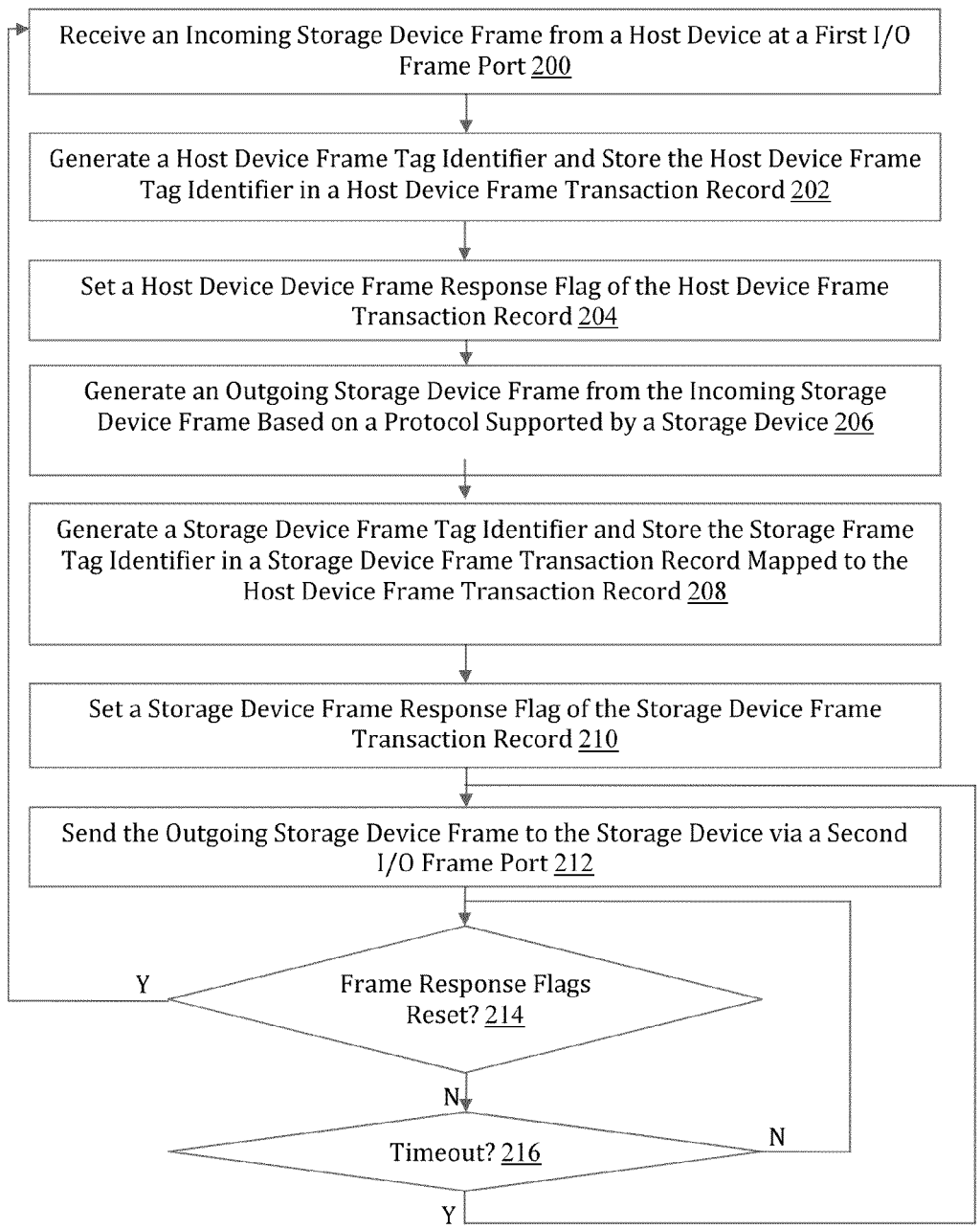
FIG. 2 is a flowchart of an exemplary method for processing incoming and outgoing storage device frames while maintaining frame order control irrespective of the frame sequencing required by the protocol associated with the frames.

Referring to FIGS. 1-5, exemplary methods for frame order control in a multi-protocol SAN will now be described. Referring more specifically to FIG. 2, a flowchart of an exemplary method for processing incoming and outgoing destination device frames while maintaining frame order control irrespective of the frame sequencing required by the protocol associated with the frames is illustrated. In this example, in step 200, the multi-protocol switch processing device 12 receives an incoming storage device frame from the host device 16 at a first one of the I/O frame ports 38(1)-38(n). The incoming storage device frame can be sent by the host device 16 to the multi-protocol switch processing device 12 in response to a request for data received from one of the client devices 18(1)-18(n) over communication network 20, for example, although the incoming storage device frame can be received based on other types of network activity. Optionally, the first one of the I/O frame ports 38(1)-38(n) is preconfigured by a current one of the configuration records 50 to be associated with the host device 16.

In step 202, the multi-protocol switch processing device 12 generates a host device frame tag identifier for the incoming storage device frame and stores the host device frame tag identifier in a host device one of the frame transaction records 48. The host device frame tag identifier can be any type of identifier, such as a collection of numbers and/or letters for example, that is unique in that it is not currently stored in another one of the frame transaction records 48. Optionally, the multi-protocol switch processing device 12 stores the host device frame tag identifier as associated with the first one of the I/O frame ports 38(1)-38(n) at which the incoming storage device frame was received. Additionally, the multi-protocol switch processing device 12 moves the incoming storage device frame to a first one of the I/O frame buffers 40(1)-40(n) associated with the first one of the I/O frame ports 38(1)-38(n) for storage until the multi-protocol handling system 32, for example, is available to retrieve and continue processing the incoming storage device frame, as described and illustrated in more detail later.

In step 204, the multi-protocol switch processing device 12 sets a host device frame response flag of the host device one of the frame transaction records 48 for the incoming storage device frame. The host device frame response flag can be a boolean value or any other type of flag or indicator that an incoming storage device frame corresponding to the incoming one of the frame transaction records 48 has been received.

In step 206, the multi-protocol switch processing device 12 retrieves the incoming storage device frame from the first one of the I/O frame buffers 40(1)-40(n) and generates an outgoing storage device frame from the incoming storage device frame based on a protocol supported by one of the storage devices 14(1)-14(n) to which the generated outgoing storage device frame is to be sent. Methods for translating or converting incoming storage device frames to generate outgoing storage device frames are described and illustrated in Indian Patent Application No. 3825/CHE/2013, filed Aug. 28, 2013 and entitled "Systems and Methods for Multi-Protocol Translation," which is incorporated by reference herein in its entirety.

The one of the storage devices 14(1)-14(n) to which the outgoing storage device frame is to be sent can be identified based on information included in the incoming storage device frame, for example, although other methods of identifying the one of the storage devices 14(1)-14(n) can also be used. Additionally, the protocol supported by the one of the storage devices 14(1)-14(n) can be determined based on a table stored in the memory 46 having a mapping of storage devices 14(1)-14(n) to supported protocols, although other methods of identifying the supported protocol can also be used.

Subsequent to converting or translating the incoming storage device frame to generate the outgoing storage device frame, the outgoing storage device frame can be stored in a second one of the I/O frame buffers 40(1)-40(n) associated with a second one of the I/O frame ports 38(1)-38(n). Optionally, the second one of the I/O frame ports 38(1)-38(n) is preconfigured by a current one of the configuration records 50 to be associated with the one of the storage devices 14(1)-14(n).

In step 208, the multi-protocol switch processing device 12 retrieves the outgoing storage device frame from the second one of the I/O frame buffers 38(1)-38(n), generates a storage device frame tag identifier, and stores the storage device frame tag identifier in a storage device one of the frame transaction records 48. The storage device frame tag identifier can be any type of identifier, such as a collection of numbers and/or letters for example, that is unique in that it is not currently stored in another one of the frame transaction records 48. In this example, the multi-protocol switch processing device 12 inserts the storage device frame tag identifier into the outgoing storage device frame, such as in a frame header.

Optionally, the multi-protocol switch processing device 12 stores the storage device frame tag identifier as associated with the second one of the I/O frame ports 38(1)-38(n) from which the outgoing storage device frame will be sent. In this example, the storage device one of the frame transaction records 48 is mapped to the host device one of the frame transaction records 48 used to store the host device frame tag identifier in step 202. Additionally, the multi-protocol switch processing device 12 moves the outgoing storage device frame to a second one of the I/O frame buffers 40(1)-40(n) associated with the second one of the I/O frame ports 38(1)-38(n) for storage until the multi-protocol handling system 32, for example, is available to retrieve and continue processing the outgoing storage device frame.

In step 210, the multi-protocol switch processing device 12 retrieves the outgoing storage device frame from the second one of the I/O frame buffers 40(1)-40(n) and sets an storage device frame response flag of the storage device frame transaction record for the outgoing storage device frame. The storage device frame response flag can be a boolean value or any other type of flag or indicator that an outgoing storage device frame corresponding to the storage device one of the frame transaction records 48 has been sent to one of the storage devices 14(1)-14(n). The storage device one of the frame transaction records 48 can be identified by the multi-protocol switch processing device 12 based on the storage device frame tag identifier inserted into the retrieved outgoing storage device frame, for example, although other methods of identifying the storage device one of the frame transaction records 48 can also be used.

In step 212, the multi-protocol switch processing device 12 sends the retrieved outgoing storage device frame to the one of the storage devices 14(1)-14(n) via the second one of the I/O frame ports 38(1)-38(n) associated with the second one of the I/O frame buffers 40(1)-40(n).

In step 214, the multi-protocol switch processing device 12 determines whether both of the host device frame response and storage device frame response flags set in steps 204 and 10, respectively, have been reset. The storage device frame response flag and host device frame response flag are reset when a incoming host device frame is received by the multi-protocol switch processing device 12 in response to the outgoing storage device frame and when an outgoing host device frame generated from the incoming host device frame is sent to the host device 16, respectively, as described and illustrated later with reference to FIG. 3. If the multi-protocol switch processing device 12 determines that the host device frame response and storage device frame response flags have not been reset, then the No branch is taken to step 216.

In step 216, the multi-protocol switch processing device 12 determines whether a specified time period without receiving the incoming host device frame has elapsed. The specified time period is associated with the protocol supported by the one of the storage devices 14(1)-14(n) and, accordingly, can vary based on protocol. The specified time period is a default period associated with the protocol which is used to indicate that a frame drop or loss, in this example of the outgoing storage device frame to the one of the storage devices 14(1)-14(n) or the incoming host device frame from the one of the storage devices 14(1)-14n), has occurred. If the multi-protocol switch processing device 12 determines that the specified time period without receiving the incoming host device frame has elapsed, then the Yes branch is taken back to step 212 and the multi-protocol switch processing device 12 resends the outgoing storage device frame to the one of the storage devices 14(1)-14(n) via the second one of the I/O frame ports 38(1)-38(n), as described and illustrated earlier.

Referring back to step 216, if the multi-protocol switch processing device 12 determines that the specified time period without receiving the incoming host device frame has not elapsed, then the No branch is taken back to step 214 and the multi-protocol switch processing device 12 effectively waits for either the host device frame response and storage device frame response flags to be reset or a timeout to occur. Referring back to step 214, if the multi-protocol switch processing device 12 determines that the host device frame response and storage device frame response flags have been reset, then the Yes branch is taken back to step 200 and a next incoming frame from the host device 16 is retrieved.

The next incoming storage device frame can be retrieved by the multi-protocol switch processing device 12 from the first one of the I/O frame buffers 40(1)-40(n) in one example. In another example, the multi-protocol switch processing device 12 can communicate with the host device 16 to cause the host device 16 to initiate the communication of the next incoming frame. Other methods of retrieving the next incoming frame can also be used.

Figure 3:
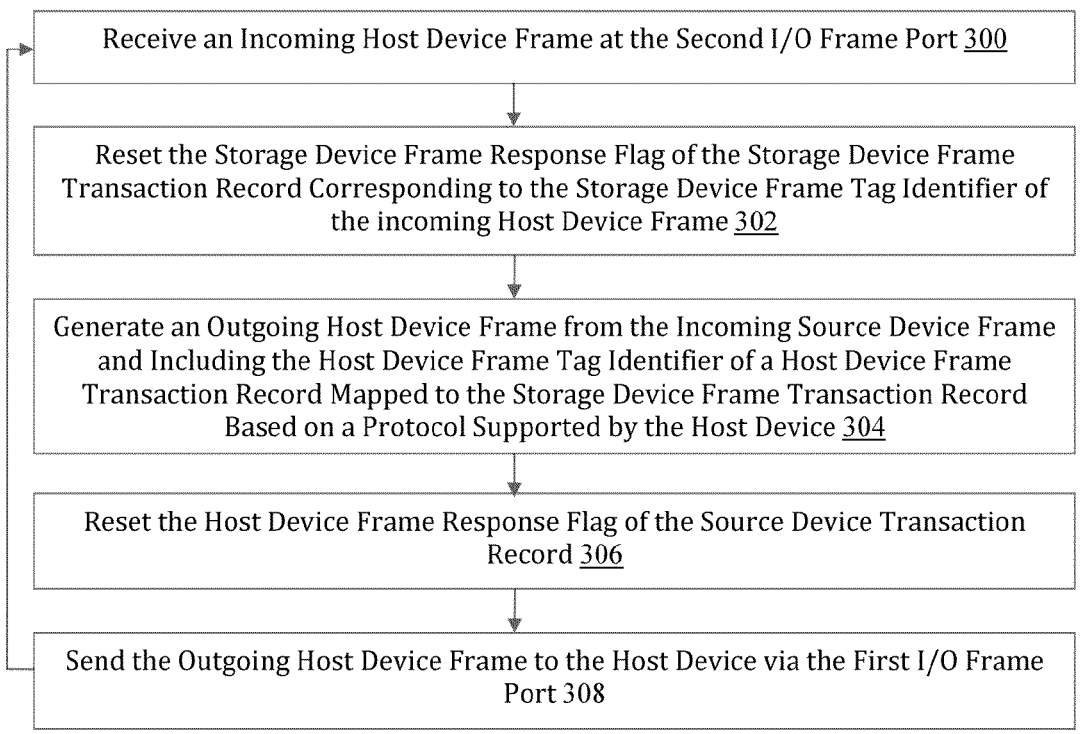
FIG. 3 is a flowchart of an exemplary method for processing incoming and outgoing host device frames while maintaining frame order control irrespective of the frame sequencing required by the protocol associated with the frames.

Referring more specifically to FIG. 3 a flowchart of an exemplary method for processing incoming and outgoing host device frames while maintaining frame order control irrespective of the frame sequencing required by the protocol associated with the frames is illustrated. In this example, in step 300, the multi-protocol switch processing device 12 receives an incoming host device frame at the second one of the I/O frame ports 38(1)-38(n) from the one of the storage devices 14(1)-14(n). The incoming host device frame is received in response to the outgoing storage device frame sent to the one of the storage devices 14(1)-14(n), for example, as described and illustrated earlier with reference to step 212.

In step 302, the multi-protocol switch processing device 12 resets the storage device frame response flag of the storage device one of the frame transaction records 48 that was previously set in step 210, for example. In this example, the one of the storage devices 14(1)-14(n) is configured to return, along with the incoming host device frame, the storage device frame tag identifier that was inserted into the outgoing storage device frame sent in step 212, for example. Accordingly, the multi-protocol switch processing device 12 can identify the storage device one of the frame transaction records 48 for which the storage device frame response flag is to be reset based on a match of the storage device frame tag identifier included in the incoming host device frame and the storage device frame tag identifier of the storage device one of the frame transaction records 48. Subsequent to resetting the storage device frame response flag, the multi-protocol switch processing device 12 moves the incoming host device frame to the second one of the I/O frame buffers 40(1)-40(n) associated with the second one of the I/O frame ports 38(1)-38(n) for storage until the multi-protocol handling system 32, for example, is available to retrieve and continue processing the incoming host device frame.

In step 304, the multi-protocol switch processing device 12 retrieves the incoming host device frame from the second one of the I/O frame buffers 40(1)-40(n) and generates an outgoing host device frame from the incoming host device frame based on a protocol supported by the host device 16 to which the generated outgoing host device frame is to be sent. Accordingly, the multi-protocol switch processing device 12 translates or converts the incoming host device frame to generate the outgoing host device frame using methods and systems described and illustrated earlier with reference to step 304.

In order to identify the protocol supported by the host device 16, the multi-protocol switch processing device 12 can use a table stored in the memory 46 having a mapping of I/O frame ports 38(1)-38(n) and/or host devices to supported protocols. In one example, the host device 16 and/or associated first one of the I/O frame ports 38(1)-38(n) can be identified based on information included in the incoming host device frame. In this example, the multi-protocol switch processing device 12 uses the storage device frame tag identifier included in the incoming host device frame to identify the storage device one of the frame transaction records 48. With the storage device one of the frame transaction records 48, the multi-protocol switch processing device 12 identifies the host device one of the frame transaction records 48 previously mapped to the storage device one of the frame transaction records 48, as described and illustrated earlier with reference to step 208. The host device one of the frame transaction records 48 in this example includes the first one of the I/O frame ports 38(1)-38(n) optionally inserted into the host device one of the frame transaction records 48, as described and illustrated earlier with reference to step 202.

The multi-protocol switch processing device 12 can then use the identified first one of the I/O frame ports 38(1)-38(n), or the host device 16 identified as associated with the first one of the I/O frame ports 38(1)-38(n), to determine the protocol supported by the host device 16 based on a match in a table stored in the memory 46, for example. Other methods of determining the protocol supported by the host device 16 can also be used.

Additionally, in step 304, the multi-protocol switch processing device 12 inserts the host device frame tag identifier into the outgoing host device frame, such as in a frame header for example. In order to identify the host device frame tag identifier, the multi-protocol switch processing device 12 uses the storage device frame tag identifier included in the incoming host device frame to identify the storage device one of the frame transaction records 48. With the storage device one of the frame transaction records 48, the multi-protocol switch processing device 12 identifies the host device one of the frame transaction records 48 previously mapped to the storage device one of the frame transaction records 48, as described and illustrated earlier with reference to step 208. The host device one of the frame transaction records 48 in this example includes the host device frame tag identifier as stored in step 202, as described and illustrated earlier. Subsequent to generating the outgoing host device frame, the multi-protocol switch processing device 12 moves the outgoing host device frame to the first one of the I/O frame buffers 40(1)-40(n) associated with the first one of the I/O frame ports 38(1)-38(n) for storage until the multi-protocol handling system 32, for example, is available to retrieve and continue processing the incoming host device frame.

In step 306, the multi-protocol switch processing device 12 retrieves the outgoing host device frame from the first one of the I/O frame buffers 40(1)-40(n) and resets the host device frame response flag of the host device one of the frame transaction records 48. The host device one of the frame transaction records 48 is identified by the multi-protocol switch processing device 12 based on a match of the host device frame tag identifier inserted into the outgoing host device frame in step 304 with the host device frame tag identifier of the host device one of the frame transaction records 48, for example. In step 308, the multi-protocol switch processing device 12 sends the outgoing host device frame to the host device 16 via the first one of the I/O frame ports 38(1)-38(n) associated with the first one of the I/O frame buffers 40(1)-40(n).

Optionally, the host device and storage device ones of the frame transaction records 48 can be removed by the multi-protocol switch processing device 12 from the frame transaction records 48 subsequent to sending the outgoing host device frame in step 308. Also optionally, the host device and storage device frame tag identifiers included in the removed host device and storage device ones of the frame transaction records 48 can be reused by the multi-protocol switch processing device 12 in steps 202 and steps 208, respectively, as described and illustrated earlier.

Referring more specifically to FIG. 4, a block diagram of an exemplary flow of incoming and outgoing frames exchanged between the host device 16 and a storage device 14(1) is illustrated. In this example, the incoming storage device frame is received by a first I/O frame port 38(1) of the multi-protocol switch processing device 12 from the host device 16. The multi-protocol handling system 32 in this example retrieves the incoming storage device frame from the first I/O frame port 38(1) and generates an outgoing storage device frame which is sent via the second I/O frame port to the storage device 14(1).

In response to the outgoing storage device frame, the multi-protocol switch processing device 12 receives an incoming host device frame at the second I/O frame port 38(2). The incoming host device frame is retrieved by the multi-protocol handling system 32 in this example from the second I/O frame port 38(2) and generates an outgoing host device frame from the incoming host device frame which is sent to the host device 16 via the first I/O frame port 38(1). Other incoming frames can be received from other host devices (not shown) at the first I/O frame port 38(1) and/or other of the I/O frame ports 38(2)-28(n) during any of the steps described and illustrated earlier with reference to FIGS. 2 and 3. Additionally, other outgoing frames can be received from the storage device 14(1) or other of the storage devices 14(2)-14(n) during any of the steps described and illustrated earlier with reference to FIGS. 2 and 3.

Referring more specifically to FIG. 5, an exemplary table of frame transaction records 48 is illustrated. In this example, the frame transaction records 48 include a host device frame transaction record 500 mapped to an storage device frame transaction record 502. The host device frame transaction and storage device frame transaction records 500 and 502 include a host device frame tag identifier 504 and an storage device frame tag identifier 506, respectively. The host device frame transaction and storage device frame transaction records 500 and 502 also include an indication of the first one of the I/O frame ports 38(1)-38(n) 508 and an indication of the second one of the I/O frame ports 38(1)-38(n) 510, respectively.

Additionally, the host device frame transaction and storage device frame transaction records 500 and 502 include a host device frame response flag 512 and storage device frame response flag 514, respectively. In this example, the host device frame response flag and storage device frame response flag 512 and 514 each have a value of "1" indicating that the host device frame response flag and storage device frame response flag 512 and 514 are set. Accordingly, the host device frame transaction and storage device frame transaction records 500 and 502 in this example are in an exemplary state corresponding with completion of step 212 by the multi-protocol switch processing device 12.

With this technology, a subsequent incoming storage device frame is not retrieved or processed from a host device until the immediately prior frame has been processed, including by receiving a response from a storage device and sending the response to the host device. By waiting until the prior frame is processed to retrieve a next incoming storage device frame, the sequence of frames or frame order is maintained irrespective of whether the protocol supported by the host device and/or a storage device requires in-order or out-of-order frame sequencing. Accordingly, performance issues such as out of order delivery and frame drops or loss, for example, can advantageously be reduce in SANs including various source and storage devices supporting protocols requiring both in-order and our-of-order frame sequencing.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for frame order control, the method comprising:

sending, with a multi-protocol switch processing device, an outgoing storage device frame to a storage device, the outgoing storage device frame converted from an incoming storage device frame received from a host device based on a protocol supported by the storage device;

receiving, with the multi-protocol switch processing device, an incoming host device frame from the storage device in response to the outgoing storage device frame;

determining, with the multi-protocol switch processing device, whether an outgoing host device frame has been sent to the host device, the outgoing host device frame converted from the incoming host device frame based on a protocol supported by the host device, wherein the protocol supported by the host device requires a different frame sequencing than the protocol supported by the storage device;

retrieving, with the multi-protocol switch processing device, a next incoming storage device frame received from the host device when the outgoing host device frame is determined to have been sent to the host device;

generating, with the multi-protocol switch processing device, a host device frame tag identifier for the incoming storage device frame and storing the host device frame tag identifier in and setting a host device frame response flag of a host device frame transaction record; and generating, with the multi-protocol switch processing device, a storage device frame tag identifier and storing the storage device frame tag identifier in and setting a storage device frame response flag of a storage device frame transaction record mapped to the host device frame transaction record.

2. The method of claim 1, wherein:

the incoming storage device frame is received at and the outgoing host device frame is sent via a first I/O frame port and the outgoing storage device frame is sent via and the incoming host device frame is received at a second I/O frame port; and the host device frame tag identifier is further stored in the host device frame transaction record as associated with the first I/O frame port and the storage device frame tag identifier is further stored in the storage device frame transaction record as associated with the second I/O frame port.

3. The method of claim 1, further comprising:

resetting, with the multi-protocol switch processing device, the storage device frame response flag upon receiving the incoming host device frame, the incoming host device frame including the storage device frame tag identifier; and resetting, with the multi-protocol switch processing device, the host device frame response flag upon sending the outgoing host device frame.

4. The method of claim 1, wherein the resetting the storage device frame response flag further comprises retrieving the storage device frame transaction record based on the storage device frame tag identifier included in the incoming host device frame and the resetting the host device frame response flag further comprises retrieving the host device frame transaction record based on the mapping of the storage device frame transaction record to the host device frame transaction record.

5. The method of claim 3, wherein the determining further comprises determining whether the host device and storage device frame response flags have been reset.

6. The method of claim 1, further comprising:

determining, with the multi-protocol switch processing device, whether a specified time period without receiving the incoming host device frame has elapsed, the specified time period associated with the protocol supported by the storage device; and resending, with the multi-protocol switch processing device, the outgoing storage device frame to the storage device via a second I/O frame port when the specified time period is determined to have elapsed.

7. The method of claim 1, wherein the protocol supported by the storage device requires in-order frame sequencing and the protocol supported by the host device requires in-order frame sequencing.

8. The method of claim 1, further comprising:

generating, with the multi-protocol switch processing device, a modified configuration record based on a received modification of a current configuration record, the modification corresponding to a configuration selected from I/O frame port configuration, I/O frame buffer configuration, I/O frame port mode configuration, or I/O frame port association; and replacing, with the multi-protocol switch processing device, the current configuration record with the modified configuration record and last configuration record with the current configuration record following a reset or a reboot event.

9. A multi-protocol switch processing device, comprising:

a processor coupled to a memory and configured to execute programmed instructions stored in the memory, comprising:

sending an outgoing storage device frame to a storage device, the outgoing storage device frame converted from an incoming storage device frame received from a host device based on a protocol supported by the storage device;

receiving an incoming host device frame from the storage device in response to the outgoing storage device frame;

determining whether an outgoing host device frame has been sent to the host device, the outgoing host device frame converted from the incoming host device frame based on a protocol supported by the host device, wherein the protocol supported by the host device requires a different frame sequencing than the protocol supported by the storage device; and retrieving a next incoming storage device frame received from the host device when the outgoing host device frame is determined to have been sent to the host device;

generating a host device frame tag identifier for the incoming storage device frame and storing the host device frame tag identifier in and setting a host device frame response flag of a host device frame transaction record; and generating a storage device frame tag identifier and storing the storage device frame tag identifier in and setting a storage device frame response flag of a storage device frame transaction record mapped to the host device frame transaction record.

10. The device of claim 9, wherein:

the incoming storage device frame is received at and the outgoing host device frame is sent via a first I/O frame port and the outgoing storage device frame is sent via and the incoming host device frame is received at a second I/O frame port; and the host device frame tag identifier is further stored in the host device frame transaction record as associated with the first I/O frame port and the storage device frame tag identifier is further stored in the storage device frame transaction record as associated with the second I/O frame port.

11. The device of claim 9, wherein the processor is further configured to execute programmed instructions stored in the memory further comprising:

resetting the storage device frame response flag upon receiving the incoming host device frame, the incoming host device frame including the storage device frame tag identifier; and resetting the host device frame response flag upon sending the outgoing host device frame.

12. The device of claim 9, wherein the resetting the storage device frame response flag further comprises retrieving the storage device frame transaction record based on the storage device frame tag identifier included in the incoming host device frame and the resetting the host device frame response flag further comprises retrieving the host device frame transaction record based on the mapping of the storage device frame transaction record to the host device frame transaction record.

13. The device of claim 11, wherein the determining further comprises determining whether the host device and storage device frame response flags have been reset.

14. The device of claim 9, wherein the processor is further configured to execute programmed instructions stored in the memory further comprising:

determining whether a specified time period without receiving the incoming host device frame has elapsed, the specified time period associated with the protocol supported by the storage device; and resending the outgoing storage device frame to the storage device via the second I/O frame port when the specified time period is determined to have elapsed.

15. The device of claim 9, wherein the protocol supported by the storage device requires in-order frame sequencing and the protocol supported by the host device requires in-order frame sequencing.

16. The device of claim 9, wherein the processor is further configured to execute programmed instructions stored in the memory further comprising:
generating a modified configuration record based on a received modification of a
current configuration record, the modification corresponding to a configuration selected from I/O frame port configuration, I/O frame buffer configuration, I/O frame port mode configuration, or I/O frame port association; and
replacing the current configuration record with the modified configuration record and last configuration record with the current configuration record following a reset or a reboot event.

17. A non-transitory computer readable medium having stored thereon instructions for frame order control comprising machine executable code which when executed by a processor, causes the processor to perform steps comprising:
sending an outgoing storage device frame to a storage device, the outgoing storage device frame converted from an incoming storage device frame received from a host device based on a protocol supported by the storage device;
receiving an incoming host device frame from the storage device in response to the outgoing storage device frame;
determining whether an outgoing host device frame has been sent to the host device, the outgoing host device frame converted from the incoming host device frame based on a protocol supported by the host device, wherein the protocol supported by the host device requires a different frame sequencing than the protocol supported by the storage device;
retrieving a next incoming storage device frame received from the host device when the outgoing host device frame is determined to have been sent to the host device;
generating a host device frame tag identifier for the incoming storage device frame and storing the host device frame tag identifier in and setting a host device frame response flag of a host device frame transaction record; and
generating a storage device frame tag identifier and storing the storage device frame tag identifier in and setting a storage device frame response flag of a storage device frame transaction record mapped to the host device frame transaction record.

18. The medium of claim 17, wherein:
the incoming storage device frame is received at and the outgoing host device frame is sent via a first I/O frame port and the outgoing storage device frame is sent via and the incoming host device frame is received at a second I/O frame port; and
the host device frame tag identifier is further stored in the host device frame transaction record as associated with the first I/O frame port and the storage device frame tag identifier is further stored in the storage device frame transaction record as associated with the second I/O frame port.

19. The medium of claim 17, wherein the machine executable code when executed by the processor further causes the processor to perform steps further comprising:
resetting the storage device frame response flag upon receiving the incoming host device frame, the incoming host device frame including the storage device frame tag identifier; and
resetting the host device frame response flag upon sending the outgoing host device frame.

20. The medium of claim 17, wherein the resetting the storage device frame response flag further comprises retrieving the storage device frame transaction record based on the storage device frame tag identifier included in the incoming host device frame and the resetting the host device frame response flag further comprises retrieving the host device frame transaction record based on the mapping of the storage device frame transaction record to the host device frame transaction record.

21. The medium of claim 19, wherein the determining further comprises determining whether the host device and storage device frame response flags have been reset.

22. The medium of claim 17 wherein the machine executable code when executed by the processor further causes the processor to perform steps further comprising:
determining whether a specified time period without receiving the incoming host device frame has elapsed, the specified time period associated with the protocol supported by the storage device; and
resending the outgoing storage device frame to the storage device via the second I/O frame port when the specified time period is determined to have elapsed.

23. The medium of claim 17, wherein the protocol supported by the storage device requires in-order frame sequencing and the protocol supported by the host device requires in-order frame sequencing.

24. The medium of claim 17, wherein the machine executable code when executed by the processor further causes the processor to perform steps further comprising:
generating a modified configuration record based on a received modification of a current configuration record, the modification corresponding to a configuration selected from I/O frame port configuration, I/O frame buffer configuration, I/O frame port mode configuration, or I/O frame port association; and
replacing the current configuration record with the modified configuration record and a last configuration record with the current configuration record following a reset or a reboot event.

* * * * *